Patented Oct. 14, 1952

2,614,106

UNITED STATES PATENT OFFICE 2,614,106 a,a-N-TRIMETHYL SUCCINIMIDE

Roger W. Stoughton, St. Louis, Mo., assignor to Mallinckrodt Chemical Works, St. Louis, Mo., a corporation of Missouri No Drawing. Application September 22, 1951, Serial No. 247,905

1 Claim. (Cl. 260—326.5)

This invention relates to anticonvulsants and more particularly to a novel a,a-N-trialkylsuccinimide having outstanding anticonvulsant properties.

Among the objects of this invention is the provision of a compound possessing outstanding properties as an anticonvulsant; and the provision of an anticonvulsant having low toxicity combined with a high level of anticonvulsant activity. Other features will be in part apparent and in part pointed out hereinafter.

The invention accordingly comprises the ingredients and combinations of ingredients, the proportions thereof, and features of composition, which will be exemplified in the products hereinafter described, and the scope of which will be indicated in the following claim.

The compound according to this invention is a,a-N-trimethylsuccinimide having the formula

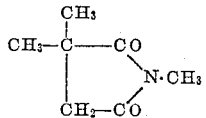

The compound of the present invention may be prepared by first forming the ammonium salt of a,a-dimethylsuccinic acid, subsequently heating the ammonium salt to form a,a-dimethylsuccinimide and thereafter methylating the a,a-dimethylsuccinimide. The a,a-dimethylsuccinic acid for the purpose of the present invention may be prepared by condensing acetone with ethyl cyanoacetate, reacting the product with hydrogen cyanide and hydrolizing the dicyanide to the acid.

The following example will serve to illustrate one method of preparation of the compound of this invention.

Example

A solution of a,a-dimethylsuccinic acid (37 g.) in water (50 ml.) was prepared and was rendered strongly basic by the addition of ammonia. The basic solution was evaporated to dryness on a steam bath. The residue was mixed with ammonium carbonate (10 g.) and heated to 200° C. for four hours. On cooling, the mixture solidified. The solidified material was recrystallized from hot water (25 ml.). A 69 per cent yield (22 g.) of pure a,a-dimethylsuccinimide melting at 107–108° C. was obtained.

In a 200 ml. 3-necked flask fitted with a stirrer and condenser, sodium metal (4 g.) was dissolved in anhydrous ethanol (100 ml.) and a,a-dimethylsuccinimide (21.8 g.) was added. When solution was complete, methyl iodide (20 cc.) was added and the mixture was refluxed for two hours. At that time the solution was neutral to phenolphthalein. The alcohol was removed by distillation and the residue was treated with ice water (50 ml.). The oil which separated was extracted with ether, washed with water and dried with sodium sulfate. The oil was finally distilled under reduced pressure, collecting the fraction boiling at 108–110° C. at 20 mm. pressure. A yield of 15.6 g. of a,a-N-trimethylsuccinimide was obtained. The product was yellow due to the presence of iodine. The yellow color was removed by washing with a saturated solution of sodium bisulfate and redistilling. a,a-N-trimethylsuccinimide was obtained as a colorless oil, soluble in organic solvents.

Analysis: Calculated for $C_7H_{11}NO_2$—N, 9.92; Found—N, 9.70.

The compound of this invention was tested for anticonvulsant activity by the Metrazol antagonism test method described in an article by Orloff, Williams and Pfeiffer, Proceedings of the Society for Experimental Biology and Medicine (1949), vol. 70, pages 254–257. The Metrazol ratio, which is a measure of the ability of the anticonvulsant compound to elevate the thresholds at which the symptoms of convulsions become apparent, was determined as follows:

Metrazol (pentamethylene-tetrazol) (0.5 per cent solution) is injected into the veins of a group of controlled animals at the rate of 0.05 cc. every ten seconds to determine the dose at which the convulsion thresholds are reached. To a similar group of test animals the minimum toxic dose of the anticonvulsant compound to be tested is administered orally. At the peak of anticonvulsant action, Metrazol is administered intravenously at the aforescribed rate. The degree of threshold elevation is expressed as the ratio of the mean of the thresholds of the protected animals to the mean of the threshold of the appropriate group of control animals of similar weight.

The following data will serve to illustrate the superiority of the compound of the present invention in comparison with the corresponding non-N-methylated-a,a-dimethylsuccinimide:

| | Metrazol ratio |
|---|---|
| a,a-N-trimethylsuccinimide | 2.24 |
| a,a-dimethylsuccinimide | 1.48 |

The compounds of the present invention possess lower toxicity than the corresponding $\alpha,\alpha$-dimethylsuccinimides as illustrated by the following data on lethal dose (LD/50) and minimum toxic dose (MTD):

|  | LT/50 mg. kg. | MTD mg. kg. |
|---|---|---|
| $\alpha,\alpha$-N-Trimethylsuccinimide | 1,500 | 750 |
| $\alpha,\alpha$-Dimethylsuccinimide | 750 | 500 |

In view of the above, it will be seen that the several objects of the invention are achieved and other advantageous results obtained.

As many changes could be made in the above products without departing from the scope of the invention, it is intended that all matter contained in the above description shall be interpreted as illustrative and not in a limiting sense.

I claim:
$\alpha,\alpha$-N-trimethylsuccinimide.

ROGER W. STOUGHTON.

No references cited.